United States Patent [19]

Haffner

[11] Patent Number: 4,840,483
[45] Date of Patent: Jun. 20, 1989

[54] ALIGNMENT TOOL FOR LASER BEAM DELIVERY SYSTEMS AND METHOD OF ALIGNMENT

[75] Inventor: James L. Haffner, Cincinnati, Ohio

[73] Assignee: Cincinnati Milacron Inc., Cincinnati, Ohio

[21] Appl. No.: 134,695

[22] Filed: Dec. 18, 1987

[51] Int. Cl.$^4$ .............................................. G01B 11/00
[52] U.S. Cl. ..................................... 356/153; 356/400
[58] Field of Search ............... 356/138, 153, 154, 399, 356/400

[56] References Cited

U.S. PATENT DOCUMENTS

| | | | |
|---|---|---|---|
| 3,532,432 | 10/1970 | Mansour | 351/121 |
| 3,816,000 | 6/1974 | Fiedler | 356/400 |
| 4,457,625 | 7/1984 | Greenleaf et al. | 356/360 |
| 4,483,618 | 11/1984 | Hamar | 356/400 |
| 4,566,202 | 1/1986 | Hamar | 33/286 |
| 4,618,759 | 10/1986 | Muller et al. | 219/121 LR |
| 4,621,926 | 11/1986 | Merry et al. | 356/363 |

OTHER PUBLICATIONS

Chesapeake Laser Systems, Inc.–Coordinate Measuring System CMS–Series 1000 (4473 Forbes Blvd., Lanham, Md. 20706).

Primary Examiner—Richard A. Rosenberger
Attorney, Agent, or Firm—Frost & Jacobs

[57] ABSTRACT

There is provided an improved tool for use in aligning both angular and translational position of a laser beam at a rotating joint of a laser beam delivery system having one or more rotatable laser optics. The tool includes a tool chassis which receives a laser beam directed along a laser beam axis to the rotating joint of the delivery system and the tool chassis. The tool further includes structure for mounting the tool chassis on the rotatable part of a rotating joint of a laser beam delivery system to be aligned, a position monitor for monitoring the laser beam received relative to a two dimensional coordinate system during rotation of the tool, and a laser beam focusing lens which focuses at least a portion of the laser beam received such that translational deviations of the received beam are eliminated from that focused portion of the beam. In conjunction with the position monitor, angular orientation of the received laser beam can be isolated and monitored when passed through the focusing lens, and translational position of the received beam can be monitored when not focused by the focusing lens.

26 Claims, 6 Drawing Sheets

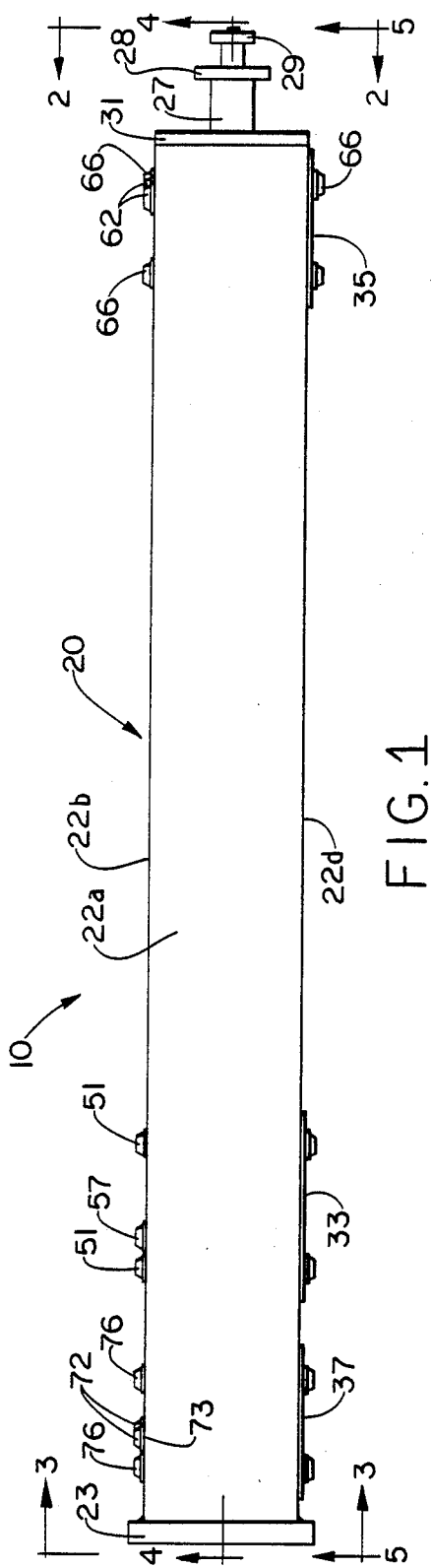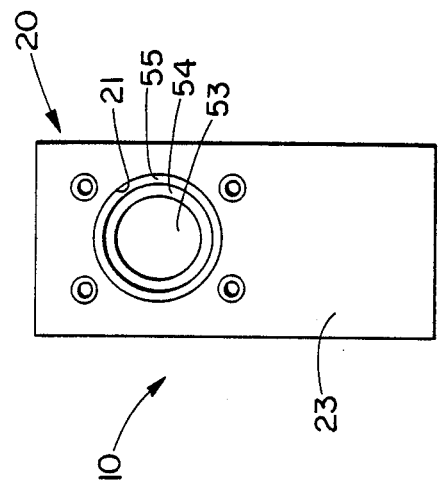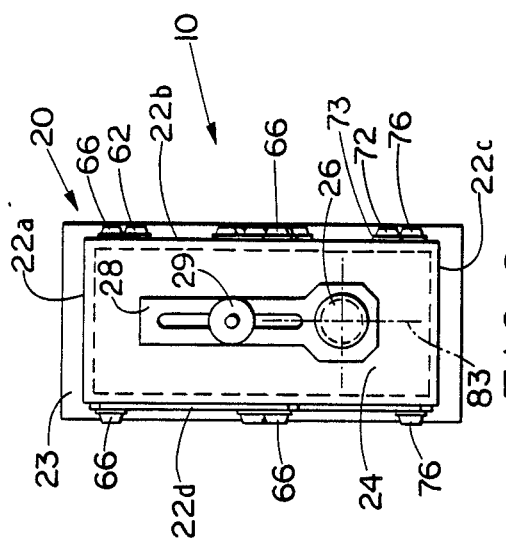

ALIGNMENT TOOL FOR LASER BEAM DELIVERY SYSTEMS AND METHOD OF ALIGNMENT

TECHNICAL FIELD

This invention relates to a tool for use in aligning a laser beam delivery system containing at least one rotating joint and having one or more rotatable laser optics, and, more particularly, to an improved tool for use in aligning both angular and translational position of a laser beam at a rotating joint of the laser beam delivery system.

BACKGROUND ART

The use of laser devices to undertake various fabrication, cutting, shaping, inspecting and other manufacturing and related operations is realizing greatly increased popularity in various industries throughout the world. As many uses for laser devices include repetitious manufacturing operations which preferably incorporate manipulator devices such as robots and the like to deliver the laser to a particular point in space or onto a particular object, it is often necessary to deliver a laser beam along and/or through various parts of a moving laser beam delivery system. The beam delivery system may take the form of a dynamic manipulator device, such as a robotic device having one or more rotating joints. In order to accomplish the transmission of the laser beam through the laser beam delivery system, it is often necessary to route the laser beam with various moveable and non-moveable optic structures, mirror packages and the like. Where a laser beam delivery system includes one or more rotating joints which carry rotatable laser optics, various translational and angular position errors of such laser beam can find their way into the system.

Position errors of a laser beam can be the cause of variable power levels, power loss, poor beam quality and various beam locational errors which cause inefficiencies and unreliability of the laser at its output location. Obviously, such inefficiencies and position inaccuracies are unacceptable in today's demanding applications. Consequently, it is critical to the efficient and accurate delivery of a laser beam to minimize the translational and angular errors of the laser beam as it is directed through its delivery system by various laser beam optics, mirror packages or the like.

One method which has been used in the industry to correct deviations of a laser beam along its delivery path is to cover the end of a portion of the laser beam delivery system with a diffusing device having a set of intersecting cross hairs drawn or etched onto one side thereof. Appropriate optics of the laser beam delivery system are thereafter adjusted to appropriately center the laser beam in the cross hairs, which preferably are located at the center of that particular portion of the laser beam delivery system. While this technique can be used to generally center the laser beam within the delivery system, its accuracy is not reliable and it is not useful in correcting for angular deviations of the laser beam. Moreover, this technique is quite inconvenient to implement in applications where such laser beam delivery system includes one or more rotating joints and one or more rotatable laser optics or mirror packages to guide the beam therethrough.

An alignment tool was also made by Spectra-Physics Inc. of San Jose, Calif. for correcting laser beam rotational errors at moving joints of laser beam delivery systems. The Spectra-Physics tool, however, required disassembling the beam delivery system and performing alignment as the system was being rebuilt. In particular, the Spectra-Physics tool comprised a focusing lens which received the laser beam and collimated the beam to a point on a screen spaced from such collimating lens at the focal length thereof. In this way, the angular errors of the beam would be isolated by the collimating effect of the lens, and any angular error could be adjusted out of the laser beam by monitoring the movement of the beam on the screen and making appropriate adjustments to the laser optics. However, the Spectra-Physics tool was large, limited solely to the removal of angular beam errors, and was difficult to use in that it required disassembly of the beam delivery system to perform the alignment procedures.

A laser measurement system is shown in U.S. Pat. No. 4,483,618 which issued to M. Hamar on Nov. 20, 1984. However, the Hamar measurement system utilizes a plurality of mirrors to place a virtual image of a sensing device at an otherwise inaccessible physical point for the purpose of accurately determining the position of that point relative to another predetermined physical point. In this way, the system is described with respect to an apparatus for measuring distances such as for locating a point on a machine part, or locating a point on a position scale. Consequently, the Hamar '618 patent fails to address the problem of aligning the angular and translational position of a laser beam delivery system containing a rotating joint and one or more rotatable laser optics. Similarly, U.S. Pat. No. 4,566,202, which issued to M. Hamar on Jan. 28, 1986, describes a tool containing a laser source which is used to align a rotatable part about the mechanical axis of a tool. Again, this laser apparatus fails to address the need for an alignment tool for aligning both angular and translational position of a laser beam in a laser beam delivery system.

As a result, heretofore there has not been available in the industry a relatively simple, easy to use, compact, laser alignment tool which provides for efficient alignment of both angular and translational position errors of a laser beam. U.S. Pat. No. 4,618,759, which issued to G. Muller et al. on Oct. 21, 1986, sets forth an arrangement for compensating for offset and angular errors of a laser utilized in a processing or measuring machine. However, the beam position control arrangement set forth in Muller et al. is designed to determine and compensate for errors associated with a laser device which is generally stationary, and is designed for permanent application in a particular machine to constantly monitor the beam accuracy. The Muller et al. device, therefore, is not suited for use in a portable tool for aligning position errors of a laser beam at a rotating joint of an articulated laser beam delivery system.

Consequently, while laser alignment is increasingly becoming more and more critical with regard to various moveable laser beam delivery systems, heretofore there has not been a tool adapted for aligning both angular and translational position of a laser beam at a rotating joint of a delivery system which can easily be utilized without disassembly of a major part of the delivery system, and which is portable and applicable to a wide variety of delivery systems. Prior art alignment tools were limited either to translational or angular alignment, were unwieldy and impractical to use in applications including rotatable laser optics, were not reasonably portable and/or applicable to various delivery systems, or required disassembly and reassembly of a major portion of the delivery system.

DISCLOSURE OF THE INVENTION

It is an object of this invention to obviate the above-described problems and shortcomings of the laser alignment tools and systems heretofore available in the industry.

It is another object of the present invention to provide an improved tool for use in aligning both angular and translational position of a laser beam.

It is yet another object of the present invention to provide a tool for use in aligning both angular and translational position of a laser beam at a rotating joint of a laser beam delivery system having one or more rotatable laser optics.

It is also an object of the present invention to provide a tool which can be adapted to a variety of laser beam delivery systems, and which can be utilized in alignment procedures without substantial disassembly of the laser beam delivery system.

In accordance with one aspect of the present invention, there is provided an improved tool for use in aligning both angular and translational position of a laser beam at a rotating joint of a laser beam delivery system having one or more rotatable laser optics. The tool includes a tool chassis which receives a laser beam which has been directed along a laser beam axis to the rotating joint of the delivery system and the tool chassis. The tool further includes structure for mounting the tool chassis on the rotatable part of a rotating joint of a laser beam delivery system to be aligned in place of a rotatable laser optic which is normally attached on that rotatable part. In this way, the chassis can be rotated about the joint. The tool further includes a position monitor for monitoring the laser beam received relative to a two dimensional coordinate system during rotation of the tool, and a laser beam focusing lens which focuses at least a portion of the laser beam received such that translational deviations of the received beam are eliminated from that focused portion of the beam. In conjunction with the position monitor, angular orientation of the received laser beam can be isolated and monitored when passed through the focusing lens, and translational position of the received beam can be monitored when not focused by the focusing lens. In this way, both translational and angular errors in the laser beam can be determined.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 1 is a top plan view of a preferred embodiment of an alignment tool for laser beam delivery systems made in accordance with the subject invention;

FIG. 2 is a right end view of the alignment tool of FIG. 1;

FIG. 3 is a left end view of the alignment tool of FIG. 1;

DETAILED DESCRIPTION OF THE INVENTION

Figure 6:
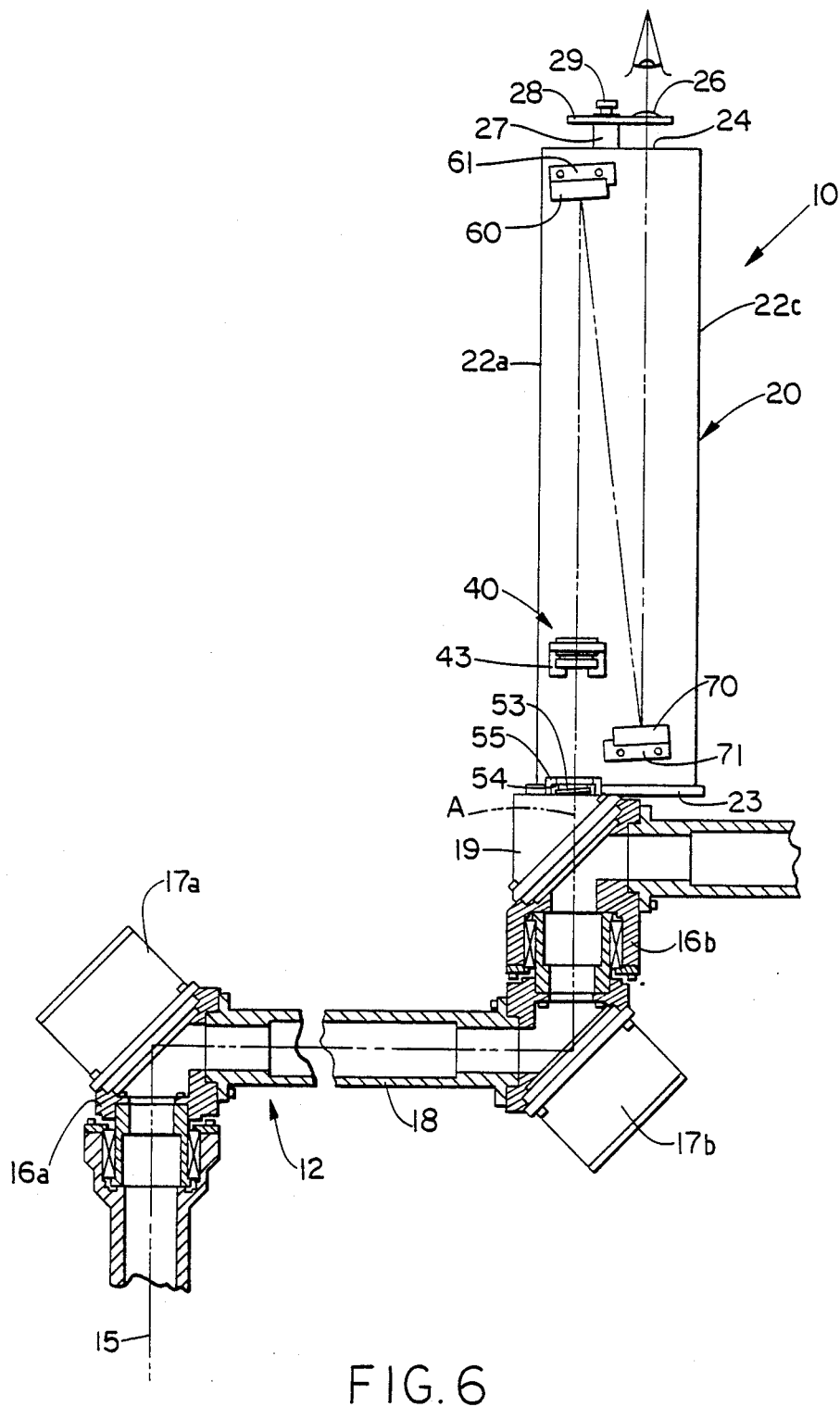
FIG. 6 is a schematic illustration of the alignment tool of FIG. 1, illustrated as being attached to the rotatable part of a rotating joint of a laser beam delivery system.

Referring now to the drawings in detail, wherein like numerals indicate the same elements throughout the views, FIG. 1 illustrates a preferred embodiment of an alignment tool 10 of the present invention. FIGS. 2-5 illustrate additional details of alignment tool 10 of FIG. 1, and FIG. 6 illustrates alignment tool 10 as it might be attached to a rotatable joint 16b of a laser beam delivery system 12. Alignment tool 10 is shown as comprising tool chassis 20 (made up of chassis walls 22a-d), mounting means 23 (shown as plate 23) attached to one end of chassis 20, and cover 31 attached at the opposite end thereof. Chassis walls 22a-d are shown as pairs of oppositely disposed side walls in the figures only as an example. Chassis 20 might preferably be an extruded, one piece, rectangular structure as shown; or could be formed from several pieces and feature any outside conformation desired.

As best seen in the end view of FIG. 3, mounting means 23 includes means for receiving a laser beam, as illustrated by aperture 21, to enable the entrance of a laser beam which has been directed along a laser beam axis (i.e. see laser beam 15 and laser beam axis A shown in FIG. 6) to aperture 21 and the rotating joint 16b of the laser beam delivery system 12. It is preferred to attenuate the laser beam intensity entering tool 10 by the use of one or more filtering devices, such as neutral density filter 53 shown in FIGS. 3 and 4. Neutral density filter 53 is shown as being mounted at a slight angle to beam axis A within filter mount 54 and filter insert 55 fitted within aperture 21. Filter insert 55 further includes a relatively large aperture 55a to enable unencumbered passage of a laser beam therethrough. The arrangement of filter 53 in a non-normal relationship relative the beam axis A is important to ensure that the filter does not reflect a substantial portion of the laser beam back towards its source, as such beam reflection might interfere with proper laser beam operation and may damage the laser source itself. It is contemplated that filter mount 54 might preferably be threadedly mounted within filter insert 55 to facilitate removal of such filter for cleaning, maintenance and the like. It should be noted that the exact location of any filters (e.g. 53) within tool 10 is not critical, and can be modified as desired.

Laser beam 15 is thereby received by tool chassis 10 along beam axis A through aperture 21, and thereafter continues along that same axis A through focusing lens package 40 mounted within chassis 20. As seen best in FIG. 1, focusing lens package 40 is preferably mounted within chassis 20 by one or more removeable bolts (e.g. button head screw 57). Focusing lens package 40 comprises a beam focusing lens 41 held within lens holder 42, which is in turn threadedly mounted within lens mount 43. Lens mount 43 is preferably located within chassis 20 by one or more locating pins 45. Lens holder 42 is preferably threadedly mounted within lens mount 43 to provide limited longitudinal adjustability of focusing lens 41 along laser beam axis A. As will be discussed in greater detail below, such adjustment ensures proper focusing of the laser beam onto a monitoring means or screen 24 at the distal end of the alignment tool 10.

Once focusing lens 41 has been properly positioned, lens mount set screw 44 can be tightened to maintain that desired position. A plurality of holes H are illustrated in the forward portion of lens holder 42 to facilitate turning of lens holder 42 relative lens mount 43 for adjustment of focusing lens 41. To further enable easy access to holes H, it is preferred that lens mount 43 comprise a substantially L-shaped bracket (e.g. 43a) to support lens mount 43 within chassis 20 without interfering with access to holes H. Lens mount 43 is preferably attached within chassis 20 by one or more buttonhead screws 57 anchoring bracket 43a to chassis wall 22b. Lens access cover 33 is utilized to cover access opening 32, and access cover 33 is shown as being mounted by a pair of staggered standoffs 50 which are held in place by oppositely disposed buttonhead screws 51 and washers 52. Any manner of removably attaching cover 33 could equally be utilized, to provide ready access to lens package 40 from the exterior of tool 10.

Laser beam focusing lens 41 is provided to focus at least a portion of received laser beam 15 such that translational deviations of the received laser beam are eliminated when such beam passes through the focusing lens, thereby enabling angular orientation or position of the received laser beam 15 to be isolated and monitored on monitoring means or screen 24. Any laser beam entering focusing lens 41 parallel to the lens axis will be focused to a point on that axis, while any beam entering lens 41 at an angle to the lens axis will be focused to a point offset from such axis. This offset will be equal to the focal length of lens 41 multiplied by the sine of the angle at which the laser beam is entering lens 41. By properly locating focusing lens 41 at its focal length from monitoring means 24, angular deviations of received beam 15 can be isolated and viewed on monitoring means 24. Further details of this position monitoring process will be discussed below.

It is contemplated that focusing lens 41 may be moved between an operating position, wherein it focuses at least a portion of received beam 15, and a non-operating position, wherein received beam 15 continues along its axis A in an unfocused condition. It should also be noted that an additional neutral density filter 47 is shown as being attached to the downstream side of lens holder 42. This neutral density filter 47 is purely optional, and its use will depend upon whether additional attenuation of the laser beam intensity is required.

Whether or not the focusing lens 41 is in its operating or non-operating position, received laser beam 15 will continue along axis A toward first folding mirror 60. It should be noted that first folding mirror 60 and second folding mirror 70 are used herein to facilitate the provision of a tool 10 having an effective length which can accommodate the focal length of the particular focusing lens 41 being utilized. In this regard, this folding mirror arrangement is utilized to minimize the overall length of alignment tool 10 while accommodating the required focal length of focusing lens 41. In a preferred arrangement, the focal length of focusing lens 41 is approximately one meter. It should be noted that a focusing lens having a longer focal length could be used to further improve the accuracy of this alignment tool (as could a shorter focal length lens where less accuracy is acceptable). By folding the laser beam travel path within tool 10, overall length of the tool can be minimized without compromising the accuracy of the system.

Figure 4:
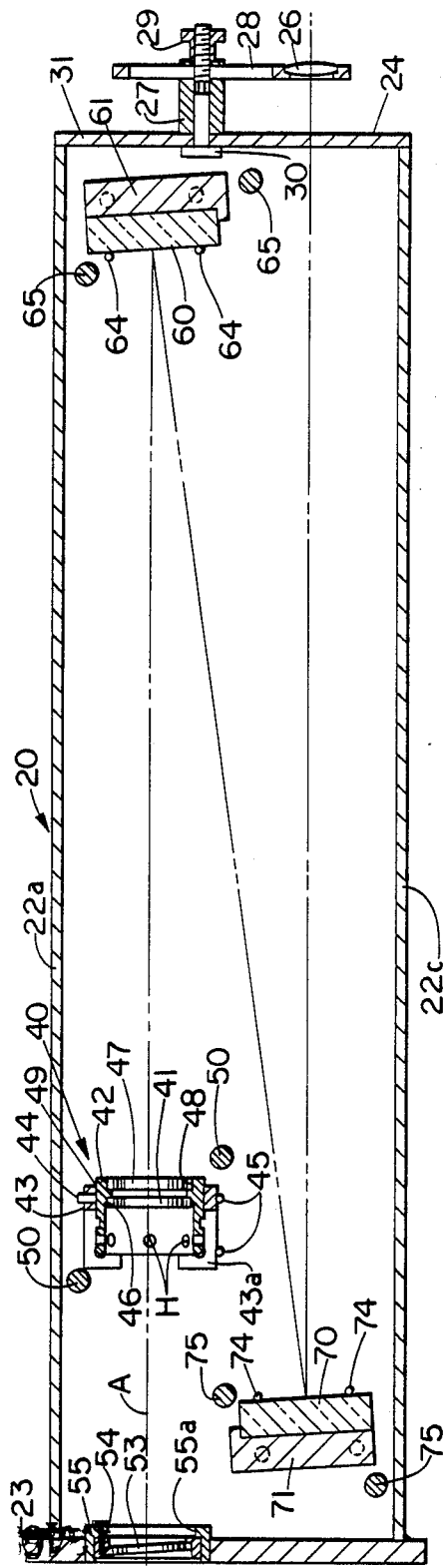
FIG. 4 is a vertical cross-sectional view of the alignment tool shown in FIG. 1, taken along line 4—4 thereof.
Figure 5:
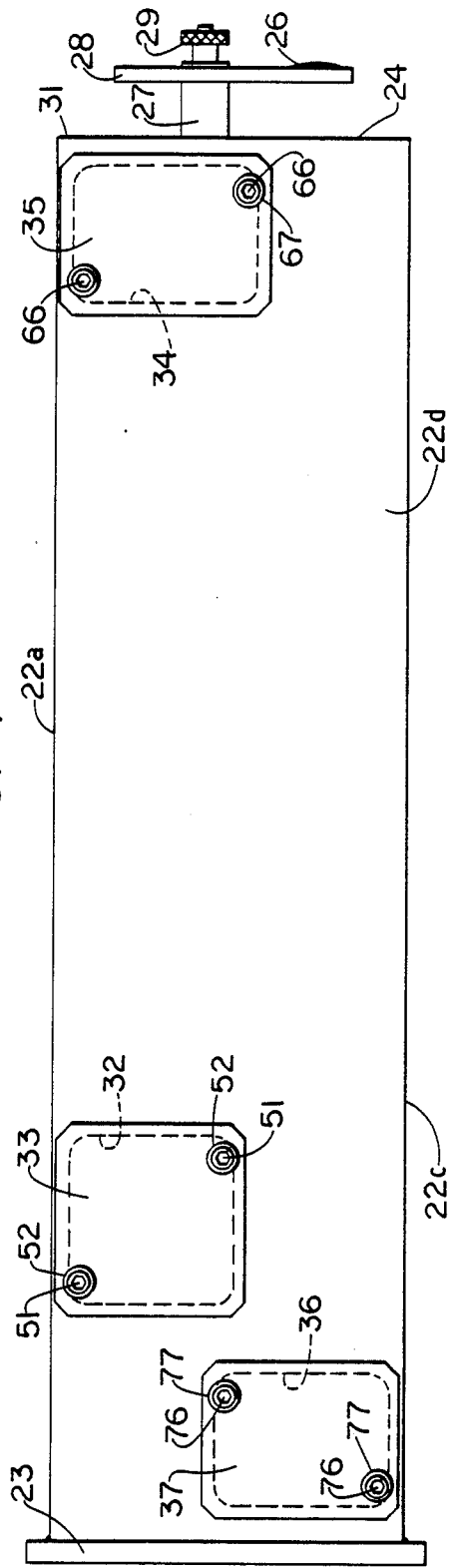
FIG. 5 is a front elevational view of the alignment tool of FIG. 1.

First folding mirror 60 is preferably a front surfaced mirror to obviate potential distortion, inaccuracies, or other interference which might result from use of rear surfaced mirrors and the like. Mirror 60 is supported by a mirror support block 61, and is preferably located by a plurality of locator pins 64. Mirror support block 61 is preferably attached to chassis 20 and chassis walls 22 by one or more buttonhead screws 62 or similar attachment means. It is preferable to provide access to folding mirror 60 from the exterior of chassis 20, such as by providing an access opening 34 which is normally covered by cover plate 35. It is contemplated that cover plate 35 might preferably be held in place by a pair of staggered threaded standoffs 65 attached at their distal ends by buttonhead screws 66 and washers 67. As is the case with all the cover plates discussed herein, while cover plate 35 could be removably attached by any means, it is contemplated that if chassis 20 is made of lightweight material such as plastic, aluminum, or the like, the use of standoffs is preferred to provide a sturdy mounting system with good durability characteristics. Locator pins 64 are utilized to ensure accurate and repeatable location of mirror 60 in order to direct the received beam properly toward second folding mirror 70, as illustrated in FIG. 4.

Second folding mirror 70 is similarly mounted on mirror support block 71, and located by a plurality of locator pins 74. Second folding mirror 70 receives the reflected laser beam from first folding mirror 60 and directs it toward monitoring means 24. Second folding mirror 70 is substantially identical in structure to first folding mirror 60. Obviously, any number of folding mirrors such as described herein could be utilized to accommodate any particular focal length of focusing lens 41, as desired. Mirror support block 71 is similarly attached to chassis 20 by a plurality of screws 72 and washers 73, and access opening 36 formed in the side of chassis 20 is similarly provided for second folding mirror 70, with cover plate 37 attached by a pair of threaded standoffs 75, buttonhead screws 76 and washers 77.

Received beam 15 is thereby directed by folding mirrors 60 and 70, respectively, onto a monitoring means 24 which is optically located at a distance from lens 41 equal to the focal length of focusing lens 41. In its simplest form, monitoring means 24 is merely a screen onto which received laser beam 15 is directed. Screen 24 can comprise simply a diffusing end plate (e.g. end plate 31) for alignment tool 10, wherein end plate 31 is simply a thickness of translucent material such as frosted Lexan ® (as available from General Electric Company) or similar material (e.g. glass, plastic, etc.) which will enable an aligning operator to visually perceive the laser beam directed thereonto. Similarly, a piece of paper might be attached over a clear end plate 31 (i.e. glass or clear plastic) to provide an effective screen 24 upon which the laser beam position ca be viewed.

Because the laser beam directed against such screen 24 will be relatively small in size (especially when passing through focusing lens 41), it is preferred that an additional magnifying lens 26 be mounted adjacent the laser beam viewing screen 24 to facilitate an operator's visual monitoring of the position of such laser beam on the screen. As seen best in FIGS. 1, 2 and 4, it is preferred that an adjustable holder 28 be mounted a convenient distance away from screen 24, such as by standoff 27. Clamp stud 30 can be used to mount standoff 27 to rear cover 31 (which may be part of the same structure as screen 24), and a threadedly mounted thumb nut 29 can be used to adjustably connect lens 26 and lens holder 28 to standoff 27. In this way, magnifying lens 26 can be selectively aligned with a particular laser beam spot on screen 24 to permit more accurate visual monitoring thereof.

In use, it is contemplated that the subject alignment tool will be mounted on the rotatable part of a rotating joint (e.g. 16b of FIG. 6) of a laser beam delivery system (e.g. 12). In particular, it is contemplated that alignment tool 10 will preferably be mounted on the rotatable part of laser beam delivery system 12 in place of a rotatable laser optic which normally is attached to such rotatable part such that tool 10 can receive laser beam 15 along its axis of transmission A. As seen best in FIG. 6, alignment tool 10 is attached to rotatable part (or joint) 16b via adapter unit 19 designed to attach alignment tool 10 to part 16b in the same way in which a laser optic or mirror package (not shown) is normally attached thereto. In this way, tool 10 can be rotated with the rotatable part 16b at the rotating joint. As used herein, the term "laser optic" shall connote any optic, mirror package or the like utilized in a laser beam delivery system to route the beam from its source to the desired end use point. Laser optic 17a shows an example of a mirror optic which is normally attached to a rotatable part 16a of laser beam delivery system 12.

Similarly, there would also normally be a rotatable laser optic substantially identical to laser optic 17a attached to rotating joint 16b. As shown in FIG. 6, alignment tool 10 has been attached in place of such laser optic at rotating joint 16b. Following mounting of alignment tool 10 on the rotatable part of rotating joint 16b of laser beam delivery system 12, laser beam 15 is received by alignment tool 10 through aperture 21 and is passed through focusing lens 41 and directed onto monitoring screen 24. An alignment operator then visually perceives the focused laser beam upon screen 24 and marks the location of such beam spot on that screen. Thereafter, alignment tool 10 is rotated about rotating joint 16b to various positions such that a plurality of laser beam spots are monitored and marked on screen 24. It is preferred that at least 3 or 4 such marks (e.g. 1 point at each 90° rotation about joint 16b) are to be made such that a pattern of movement of such beam projection locations can be generally determined. For example, it is often found that rotation of alignment tool 10 identifies a generally circular-shaped pattern of movement of the projected beam on screen 24 relative a two-dimensional coordinate system (e.g. an x-y coordinate system 83 as shown in FIG. 2), indicating angular deviations of laser beam 15. Of course, such patterns may be elliptical or non-uniform in appearance, but generally have a substantially "rounded" conformation. To correct for such deviations, one or more of the laser optics (e.g. optic 17a and/or 17b) are adjusted such that the projected beam is as closely centered within the circular deviation pattern marked on screen 24 as possible. Most often, it is preferred to adjust only the mirror which directs the laser beam into rotating joint 16b and alignment tool 10 (i.e. laser optic 17b). Following such adjustment, joint 16b is again sequentially rotated to determine if any angular deviations remain in laser beam 15. These steps can be repeated until substantially all of the angular deviations have been removed.

Following completion of the angular alignment procedures described above, it is next necessary to move focusing lens 41 to a non-operating position such that it no longer focuses beam 15 received by alignment tool 10. It is contemplated that focusing lens package 40 may be completely removed from alignment tool 10 by removing lens cover plate 33, loosening buttonhead screw (or screws) 57 attaching bracket 43a of lens mount 43 to chassis 20, and withdrawing focusing lens 41, lens holder 42 and lens mount 43 (i.e. lens package 40) from alignment tool 10. It is also contemplated that focusing lens 41 could be attached within chassis 20 in such a way as to be reciprocable between an operating position in which lens 41 focuses at least a portion of received laser beam 15, and a non-operating position wherein lens 41 does not focus laser beam 15. By making focusing lens 41 selectively moveable (e.g. moveable between operating/non-operating positions or removable from the tool entirely), received laser beam 15 can be focused for alignment of angular deviations of the laser beam, and can remain unfocused for adjustment of translational deviations of such beam.

Once focusing lens 41 has been moved to its non-operating position (or removed from the tool as described), received laser beam 15 will pass in an unfocused condition through alignment tool 10 and onto screen 24. Because the angular deviations of laser beam 15 have previously been removed by appropriate adjustments as described above, the unfocused portion of the beam effectively isolates translational deviations of beam 15 and can be utilized to monitor such translational deviations. Again, rotation of joint 16b and attached alignment tool 10 is sequentially completed and the orbit or path of the unfocused beam on screen 24 is plotted. Thereafter, appropriate adjustments are made to one or more of the preceding laser optic packages (e.g. laser optics 17a and/or 17b) in order to center the received laser beam 15 within the traced orbit of the unfocused beam on screen 24. Most often, only one laser optic need be adjusted to correct translational deviations of the laser beam. For example, as mentioned above, in the laser beam delivery system 12 shown in FIG. 6, it is contemplated that angular adjustments required to center the focused beam can most often be accomplished by adjustments of mirror package 17b by appropriately tightening or loosening orientational set screws thereof. Following correction for such angular deviations, often only adjustments to mirror package 17a will be required to correct for translational deviations as determined by alignment tool 10 with regard to the unfocused laser beam 15. In this way also, further adjustments to optic 17b (which had previously been adjusted for angular corrections) can be avoided at this time.

Following completion of necessary adjustments to remove translational deviations determined by monitoring the unfocused beam, it is generally required to repeat the entire sequence of alignment by replacing focusing lens 41 into its operating position within alignment tool 10 and repeating the entire process, as necessary. Adjusting the angle of laser beam 15 often effects the translational position of the beam, while adjusting the translational position of the beam will conversely generally effect the angular orientation or position of the beam. Consequently, the monitoring and adjustment process of the subject invention should most preferably be repeated in its entirety several times to ensure optimum accuracy. In some laser beam delivery systems, the degrees of freedom of particular laser optics or mirror packages may be limited, and not all translational and angular errors can be removed from the system. In such a case, it is most important to concentrate on adjusting and correcting for the angular errors first, as these errors are most important to ensuring efficient and effective delivery of a laser beam.

As mentioned above, the use of one or more filtering devices within alignment tool 10 is optional and will depend upon the type and power of laser beam being aligned. For example, the intensity of a laser beam exiting alignment tool 10 and being observed by an alignment operator must be maintained within permissible safety limits. In particular, for safety, any beam being monitored by the human eye must be a Class I level (e.g. see 21 C.F.R. §1040, Performance Standards for Light-Emitting Products, and ANSI Z-136.1-1986, ANSI Standard for the Safe Use of Lasers, Laser Institute of America, Toledo, Ohio) in order to be within the Maximum Permissible Exposure (MPE) for that particular beam. For example, for a continuous helium-neon (HeNe) laser beam, the Maximum Permissible Exposure is $3.9 \times 10 e-7$ Watts. If the two filters (e.g. 53 and 47) described above are utilized for alignment tool 10, and each of those filters has an optical density of 2.0, the maximum safe power of the laser source is 3.9 mW. Obviously, if different filters are to be used, or if a laser source having different power values is to be used, the combination of filters and laser source must be matched to ensure that the tool operates within safe ranges.

Figure 7:
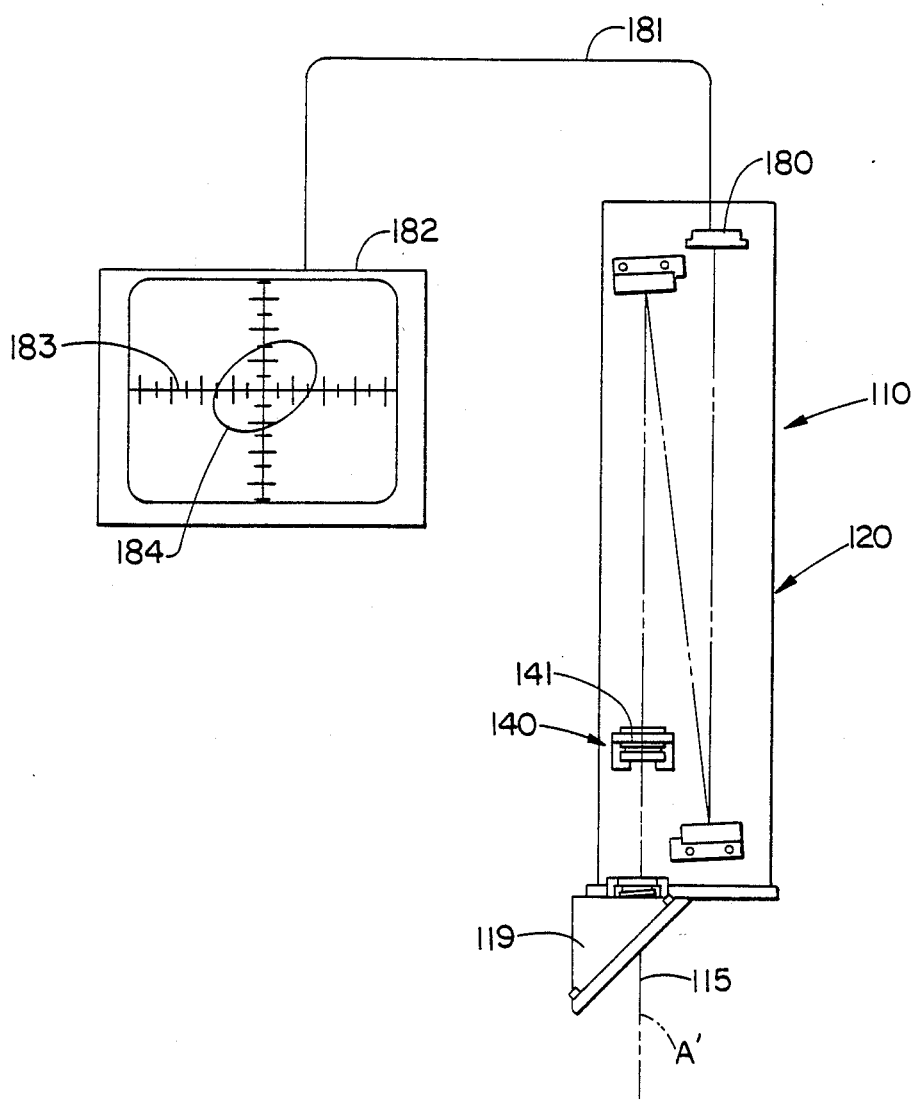
FIG. 7 is a schematic illustration of an alternate embodiment of an alignment tool made in accordance with the subject invention.

In order to provide additional safety features for the alignment tool of the subject invention, it is contemplated that the visual monitoring screen 24 described above may be replaced by a dual axis position sensor, lateral effect photodiode or similar position sensitive quadrant detector having a series of electrodes (e.g. four) equally spaced about its periphery. For example, lateral effect photodiode position sensors are available under the "SC" designation series from United Detector Technology (Hawthorne, Calif.). These detectors would, of course, be utilized in conjunction with standard support electronics (not shown), as described in the literature available from the manufacturer such as United Detector Technology. The details of such support electronics are not critical to the instant invention, and will not be discussed further herein. In particular, as illustrated in FIG. 7, a photodiode or sensor 180 can be mounted within tool chassis 120 at a distance from focusing lens 141 equal to the focal length of lens 141. Alignment tool 110 is shown with a mounting adapter unit 119 attached for illustration purposes.

A laser beam 115 is received by alignment tool 110 along laser axis A', passed through focusing lens package 140 and directed onto photodiode 180. Photodiode 180 could thereby be used to communicate the detected orbit of received beam 115 (whether focused through focusing lens 141 or as received in an unfocused condition) to a dual trace oscilloscope 182 and its screen pattern cross hairs 183 via communication link 181. In this way, oscilloscope 182 can be used to view the generally circular deviation patterns of the received laser beam 115 during rotation of tool 110. Such arrangement eliminates the need for an alignment operator to be physically within the range of motion of the laser delivery system, and eliminates the laser hazard associated with direct viewing of the beam. Use of an appropriate photodiode 180 or a similar position sensitive photodetector laser sensing device also allows the alignment tool of the subject invention to be used with laser delivery systems featuring invisible laser beams. This also enables the alignment of a wider variety of laser beam power levels with a single tool. Necessary adjustments to appropriate laser optics can thereby be determined from the oscilloscope tracing pattern as described above with regard to the manual tracings on screen 24. Use of photodiode 180 and oscilloscope 182 would also normally obviate a need for use of filters to attenuate the laser beam's intensity. It should further be noted that the unique advantages offered by a laser alignment tool made in accordance herewith include the ability to take advantage of a laser source external to the tool (i.e. the laser source typically part of the laser beam delivery system being aligned). Consequently, in many applications where the laser source of the beam delivery system can be maintained within proper power level ranges, the laser beam of the laser delivery system can be used for alignment procedures with the subject tool. Of course, an independent laser source can be utilized with the subject tool if the primary beam of the delivery system to be aligned is not (or cannot be) used. The independent laser source must first be aligned in a coaxial manner with the primary beam of the laser delivery system to insure optimum effectiveness of the alignment tool in aligning the system.

Figure 8:
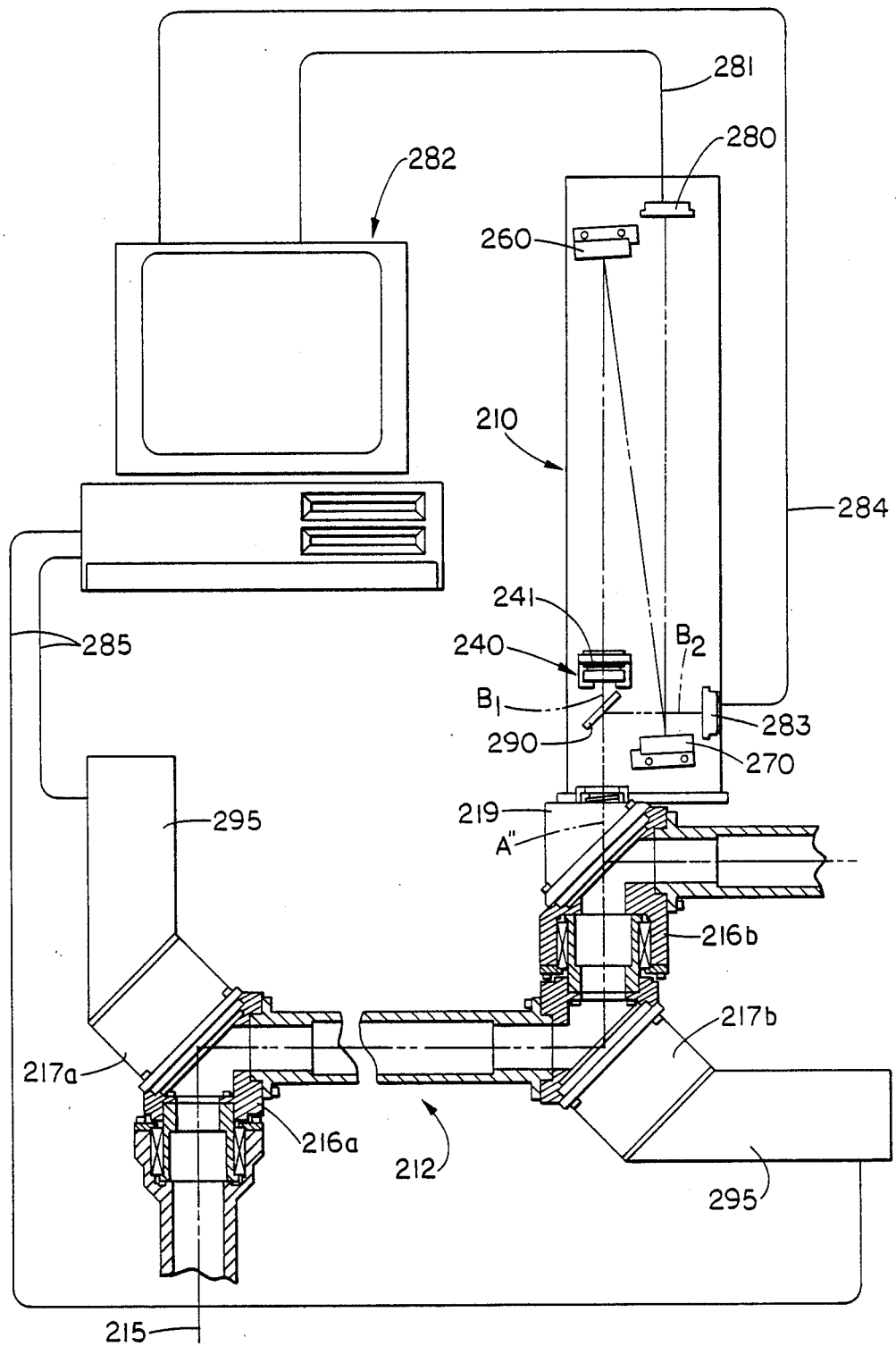
FIG. 8 is a schematic view of yet another alternate embodiment of an alignment tool made in accordance with the subject invention, illustrated as being attached to the rotatable part of a rotating joint of a laser delivery system.

It is further contemplated that the alignment tool of the subject invention can be further modified to provide for a more automated procedure and self-contained tool. In particular, FIG. 8 illustrates an alignment tool 210 further including means 290 for splitting received laser beam 215 into a plurality of beam portions (i.e. $B_1$ and $B_2$), whereby first portion $B_1$ continues to pass through focusing lens 241 to be directed onto a photodiode 280 or similar position sensing device as described above, while second portion $B_2$ remains unfocused and is directed onto a second dual position photodiode or similar position sensing device 283. In this way, angular orientation of received laser beam 215 can be determined by monitoring first portion $B_1$ of the split beam, as described above with respect to FIG. 7. By directing second portion $B_2$ of received beam 215 in an unfocused condition onto second photodiode 283, the translational position of received beam 215 can be monitored simultaneously with the angular orientation. The provision of beam splitter 290 thereby eliminates a need to remove focusing lens 241, or to move it to a non-operating position, and further permits an operator to monitor the effects on both angular and translational position of the beam when adjustments are made to preceding laser optics (e.g. mirror packages 217a and 217b) during alignment procedures. It is fully contemplated that photodiodes 280 and 283 or similar sensing devices would include standard support electronics, and can be connected via standard communication links or connectors 281 and 284, respectively, to one or more dual trace oscilloscopes, as described above.

It is also contemplated that photodiodes 280 and 283 could alternately be connected to a data acquisition system 282, such as a microprocessing unit, computer, or the like, wherein angular and translational positions of the laser beam could be compiled to determine alignment errors of the received laser beam 215. In particular, it is contemplated that the laser beam orbit patterns monitored by photodiodes 280 and 283 could be fed into data acquisition system 282, wherein such data would be fit to equations for ellipses or similar circular patterns so that the mathematical centers thereof could be computed accurately. The software of data acquisition system 282 could then provide adjustment commands for various adjustable parts of the laser beam delivery system 212 (e.g. adjustment screws for mirror packages 217a and 217b) in order to correct alignment errors determined by tool 210 to properly align laser beam 215 at rotating joint 216b.

After such adjustment commands are provided by data acquisition system 282, those commands can be implemented either manually by an alignment operator, or automatically through servo-mechanism packages 295 attached directly to the appropriate mirror packages 217a and 217b of delivery system 212. In particular, adjustment commands would be issued by data acquisition system 282 and communicated to servo-mechanisms 295 via output connectors 285. It is envisioned that servo-mechanism packages 295 or similar automatic adjusting devices would be attached to the appropriate mirror packages by removing a back plate of such mirror packages. Actual attachment of servo-mechanisms 295, of course, may vary between particular applications according to particular characteristics of the mirror packages or similar optics.

The use of servo-mechanisms to automatically implement adjustments to mirrors of various laser optics can be found in several commercially-available devices in the industry. For example, U.S. Pat. No. 4,457,625, which issued to A. Greenleaf et al. on July 3, 1984, concerns a laser measuring system utilizing a plurality of laser interferometers whose sensors supply data regarding the x, y and z coordinates of a retroreflector which is moved along the surface of an object. A central computer is utilized to store the data input from the laser sensing devices and to reduce such data to a profile of the object's surface by using mathematical techniques. The computer also utilizes the data input to control a plurality of servocontrollers to steer the interferometers. The data points collected by the computer from the laser sensing devices are accumulated in sufficient number to enable the computer to mathematically fit the data to a profile by undertaking iterative techniques. The disclosure of the Greenleaf et al. patent is hereby incorporated herein by reference.

Similarly, U.S. Pat. No. 4,621,926, which issued to J. Merry et al. on Nov. 11, 1986, describes an interferometer system for controlling the movement of an object along a predetermined non-rectilinear path, including a plurality of laser interferometers directed toward a retroreflector rigidly attached to the moving object. The Merry et al. patent discloses the use of a motive assembly or drive mechanism attached to each of the tracking mirrors which direct the associated laser output beam of a particular interferometer onto the center of the retroreflector, such motive assemblies moving the mirrors to maintain the interferometer beams incident on the center of the retroreflector. A digital computer control system controls the tracking mirrors by sending signals to the motive assemblies based upon the position data received from the interferometer output signals. The disclosure of the Merry et al. patent is hereby incorporated herein by reference. The interferometer system of the Merry et al. patent is also embodied in a laser tracking system, commonly available in the industry from Chesapeake Laser Systems, Inc. of Lanham, Md. Consequently, it is contemplated that the software and controls for laser servocorrection devices available in the industry can be adapted to the unique laser alignment tool of the subject invention to facilitate provision of a more fully automated embodiment thereof, as shown and described with respect to FIG. 8 herein.

Figure 9:
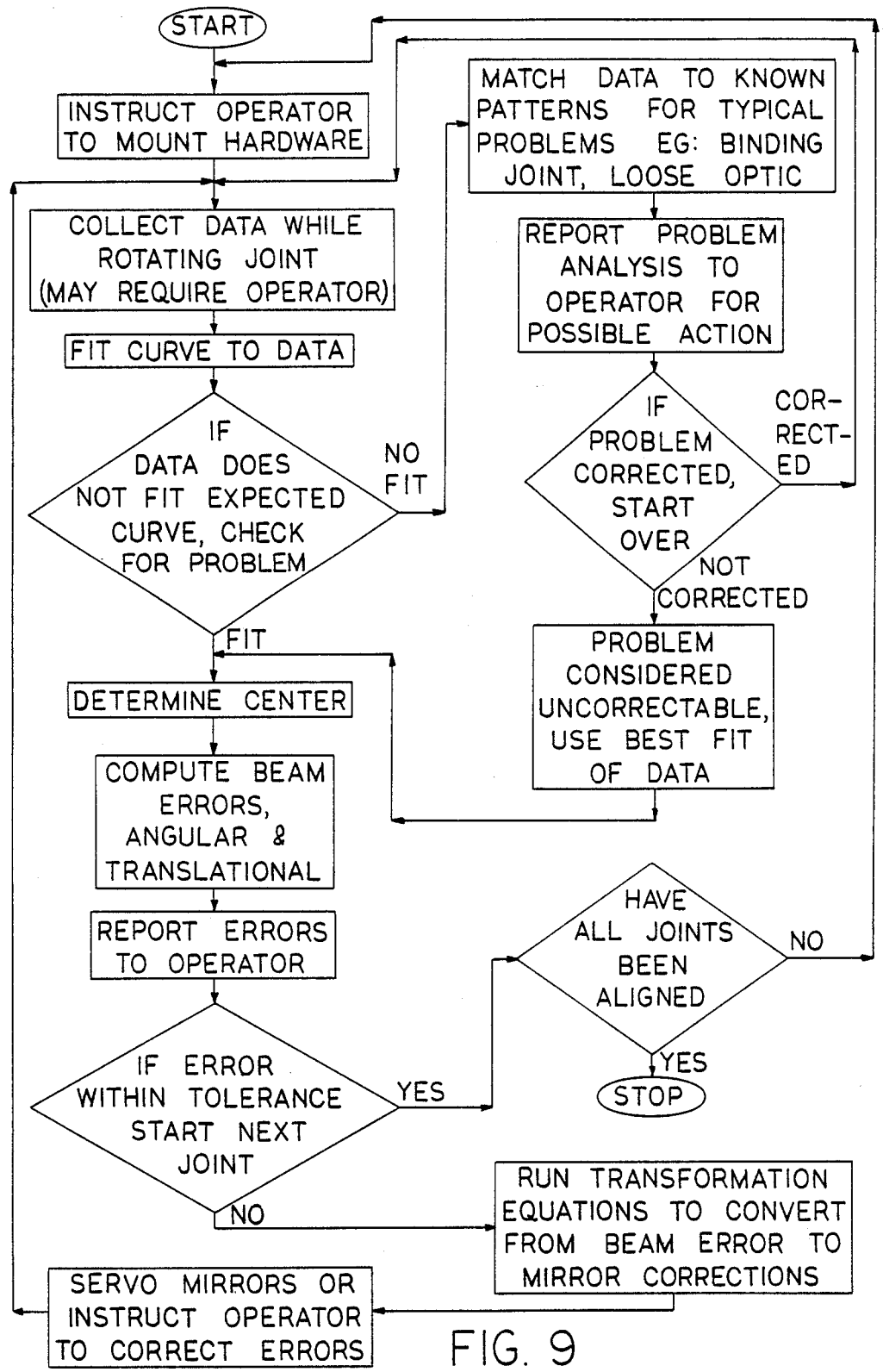
FIG. 9 is a flow chart diagram of the preferred logic for an alignment tool made in accordance herewith, especially useful where the tool is partially or fully automated.

A preferred logic diagram for such a partially or fully automated alignment tool is illustrated in FIG. 9. As shown, it is contemplated that software for such data acquisition system 282 would necessarily include transformation equations or similar adjustments to take into account various peculiarities of any particular laser delivery system 212, such as number and type of laser optics/mirror packages, degrees of freedom of such packages, and the like. If transformation equations are utilized, they can be preprogrammed, computed from user input, down loaded from the delivery system's control, or computed from measured beam deflections upon mirror/optic perturbations. Moreover, data acquisition system 282 must be able to accommodate for special problems such as binding joints and loose mirror connections which might cause irregular beam movements. As illustrated in FIG. 9, such problems could be identified and flagged for correction by the alignment operator if necessary.

It is also contemplated that the data acquisition system 282 could be independent of or integrated into the machine control for a particular laser delivery system being aligned. Peculiarities of a particular laser beam delivery system to be aligned (e.g. the system's configuration and details of particular mirror packages to be adjusted) might be entered manually into the data acquisition system 282 by the alignment operator through a keyboard input or the like, or automatically entered through a direct connection with the machine control of the delivery system 212 itself.

It is further contemplated that an alignment tool made in accordance herewith can provide a fully automated system having the capability of artificial intelligence, whereby the alignment tool can be "taught" peculiarities of a wide variety of laser beam delivery systems to thereby provide an alignment tool which can most effectively and efficiently align substantially any delivery system quickly and accurately. The data acquisition system 282 could further be programmed to provide a readout as to the accuracy of its resulting alignment for each particular delivery system. As discussed, the degree to which the subject alignment tool is automated depends upon the user's requirements and degree of sophistication desired. As described herein, and as also illustrated in the logic diagram of FIG. 9, the unique aspects of the subject alignment tool can be provided in an alignment tool having a substantial amount of manual operation involved, or can be supplied in a substantially fully automated mode. In this regard, it is contemplated that the alignment tool of the subject invention might be marketed in modular form, whereby the user could determine his relative needs for automation and obtain only those portions necessary for his particular applications. For example, those with low-powered and relatively safe laser beam power sources could utilize the simplest version as described with regard to FIGS. 1-6; wherein others might utilize one of the other embodiments for various safety reasons or the like. Moreover, the alignment tool 210 of FIG. 8 could be utilized with one or more oscilloscopes, or could be attached to a microprocessing unit or personal computer. Similarly, tool 210 could be utilized with or without the servo-mechanisms 295 for automatically implementing adjustment commands determined by data acquisition system 282.

Having shown and described the preferred embodiments of the present invention, further adaptions of the laser alignment tool described herein can be accomplished by appropriate modifications by one of ordinary skill in the art without departing from the scope of the present invention. Several of such potential modifications have been mentioned, and others will be apparent to those skilled in the art. For example, alignment tool 10 might be modified to include equipment to automatically selectively move focusing lens 41 between its operating position and a non-operating position on command. Accordingly, the scope of the present invention should be considered in terms of the following claims and is understood not to be limited to the details of structure and operation shown and described in the specification and drawings.

I claim:

1. An improved tool for use in aligning both angular and translational position of a laser beam at a rotating joint of a laser beam delivery system having one or more rotatable laser optics, said tool comprising:
   (a) a tool chassis having means for receiving a laser beam, said laser beam being directed along a laser beam axis to said rotating joint of said delivery system and to said receiving means;
   (b) means for mounting said tool chassis on the rotatable part of a rotating joint of the laser beam delivery system to be aligned, said mounting means allowing attachment of said chassis on such rotatable part such that said chassis can be rotated about said joint;
   (c) means mounted on said chassis for monitoring the position of a laser beam received relative to a two dimensional coordinate system during rotation of said tool; and
   (d) a laser beam focusing lens mounted on said chassis for focusing at least a portion of a laser beam received such that translational deviations of said received laser beam are eliminated from that focused beam, whereby in conjunction with said monitoring means angular orientation of said received laser beam can be isolated and monitored when passed through said focusing lens, the focused beam tracing a rounded pattern on said monitoring means as said tool chassis is rotated about said joint, wherein angular deviations of said beam at the rotating joint can be corrected by adjusting one or more of the laser optics to center said beam within said rounded tracing pattern, and whereby translational position of said received laser beam can be monitored when not focused by said focusing lens, the unfocused beam similarly tracing a rounded pattern on said monitoring means as said tool chassis is rotated about said joint, wherein translational deviations of said beam can be corrected by centering the unfocused beam within the rounded tracing pattern on said monitoring means, such that both translational and angular errors in said laser beam can be determined and corrected.

2. The improved alignment tool of claim 1, wherein said laser beam focusing lens is selectively moveable between an operating position wherein it focuses at least a portion of said laser beam received, and a non-operating position wherein it does not focus said laser beam.

3. The improved alignment tool of claim 1, further comprising at least one laser beam filtering device to attenuate the intensity of said received laser beam.

4. The improved alignment tool of claim 1, wherein said monitoring means includes at least one oscilloscope.

5. The improved alignment tool of claim 1, wherein said monitoring means includes a monitoring screen positioned within said chassis at a predetermined distance from said focusing lens.

6. The improved alignment tool of claim 1, wherein said monitoring means includes a data acquisition device for monitoring angular and translational position of the laser beam, said acquisition device being capable of determining alignment errors of said received laser beam to facilitate correction thereof.

7. The improved alignment tool of claim 6, wherein said data acquisition device comprises a microprocessing unit.

8. The improved alignment tool of claim 7, wherein said microprocessing device can be programmed to provide adjustment commands for adjustable parts of said laser beam delivery system to correct alignment errors determined by said tool of said laser beam at said rotating joint.

9. The improved alignment tool of claim 1, further comprising means for splitting said received laser beam into a plurality of beam portions, whereby a portion of said split beam can be focused by said focusing lens while another portion can remain unfocused, such that both angular and translational positions of said received laser beam can be monitored simultaneously.

10. The improved alignment tool of claim 1, further comprising means for automatically implementing corrective adjustments to said laser beam delivery system to correct the translational and angular errors determined.

11. An improved tool for use in aligning both angular and translational position of a laser beam at a rotating joint of a laser beam delivery system having at least one rotatable optic for delivering said laser beam, said tool comprising:
   (a) a tool chassis having means for receiving a laser beam, said laser beam being directed along a laser beam axis prior to its receipt by said tool;
   (b) means for mounting said tool chassis on the rotatable part of a rotating joint of the laser beam delivery system to be aligned in place of a rotatable optic normally mounted on such rotatable part, such that said chassis can be rotated about said joint;
   (c) at least one photo-sensitive sensor mounted on said chassis for monitoring the orientational position of the laser beam received relative a two dimensional coordinate system during rotation of said tool about the rotating joint of said system;
   (d) a laser beam focusing lens mounted on said chassis for focusing at least a portion of said received laser beam such that translational deviations of said received laser beam are eliminated from that focused beam, whereby in conjunction with said monitoring means, angular orientation of said received laser beam can be isolated and monitored when passed through said focusing lens, the focused beam tracing a rounded pattern on said sensor as said tool chassis is rotated about said joint, wherein angular deviations of said beam at said joint can be corrected by adjusting one or more of the laser optics to center said focused beam within said rounded tracing pattern on said sensor, and whereby translational position of said received laser beam can be monitored when said received beam is not focused by said focusing lens, the unfocused beam similarly tracing a rounded pattern on said sensor as said tool chassis is rotated about said joint, wherein translational deviations can be corrected by centering the unfocused beam within the rounded tracing pattern on said sensor, such that both translational and angular errors in said laser beam can be determined; and (e) data acquisition means for collecting beam position data from said at least one photo-sensitive sensor and for facilitating determination of adjustment commands for said laser beam delivery system to correct any angular and translational position errors of said laser beam at said rotating joint determined by said tool.

12. The improved alignment tool of claim 11, wherein said laser beam focusing lens is selectively moveable between an operating position wherein it focuses said laser beam received, and a non-operating position wherein said laser beam received remains unfocused.

13. The improved alignment tool of claim 11, further comprising at least one laser beam filtering device to attenuate the intensity of said received laser beam.

14. The improved alignment tool of claim 11, wherein said data acquisition means includes at least one oscilloscope.

15. The improved alignment tool of claim 11, wherein said data acquisition means comprises a microprocessing unit capable of automatically determining adjustment commands for adjustable parts of said laser beam delivery system from the angular and translational position errors determined.

16. The improved alignment tool of claim 11, further comprising means for splitting said received laser beam into a plurality of beam portions, whereby a portion of said split beam can be focused by said focusing lens while another portion can remain unfocused, such that both angular and translational positions of said received laser beam can be monitored simultaneously.

17. The improved alignment tool of claim 11, further comprising means for automatically implementing corrective adjustments to adjustable parts of said laser beam delivery system to correct for translational and angular errors determined.

18. The improved alignment tool of claim 17, wherein said means for automatically implementing corrective adjustments comprises at least one servo-mechanism for adjusting at least one optic for directing said laser beam to said rotating joint within said laser beam delivery system, said servo-mechanism automatically responding to adjustment commands.

19. An improved tool for automatically aligning both angular and translational positions of a laser beam at a rotating joint of a laser beam delivery system featuring at least one rotatable optic for delivering said laser beam, said tool comprising:

(a) a tool chassis having means for attaching said tool to the rotatable part of a rotating joint of a laser beam delivery system in place of a rotatable optic normally attached thereto for rotation about said joint, said tool chassis having means for receiving a laser beam directed along a laser beam axis at said rotating joint;

(b) at least one photo-sensitive sensor mounted on said chassis for monitoring the position of the received laser beam relative a two dimensional coordinate system;

(c) means for focusing at least a portion of said received laser beam onto said photo-sensitive sensor, whereby translational deviations of said laser beam are eliminated from that focused beam such that angular orientation of said received beam can be isolated and monitored, the focused beam tracing a rounded pattern on said sensor as said tool chassis is rotated about said joint, wherein angular deviations of said beam at said joint can be corrected by adjusting one or more of the laser optics to center said focused beam within said rounded tracing pattern on said sensor, and whereby translational position of said received beam can be monitored when the received beam is not focused by said focusing means, the unfocused beam similarly tracing a rounded pattern on said sensor as said tool chassis is rotated about said joint, wherein translational deviations can be corrected by centering the unfocused beam within the rounded tracing pattern on said sensor;

(d) data acquisition means for collecting the position tracing pattern monitored by said photo-sensitive sensor and for automatically determining necessary adjustment commands for particular adjustable parts of said laser beam delivery system to correct any angular and translational position errors of said laser beam at said rotating joint; and (e) means for automatically implementing said corrective adjustment commands for at least one adjustable laser beam optic of said laser beam delivery system, said implementing means comprising communication means for receiving said adjustment commands from said data acquisition means and at least one servo-mechanism arrangement for adjusting said optic.

20. The improved alignment tool of claim 19, wherein said laser beam focusing lens is selectively moveable between an operating position wherein it focuses said laser beam received, and a non-operating position wherein said laser beam received remains unfocused.

21. The improved alignment tool of claim 19, wherein said data acquisition device comprises a microprocessing unit.

22. The improved alignment tool of claim 19, further comprising means for splitting said received laser beam into a plurality of beam portions, whereby a portion of said split beam can be focused by said focusing lens while another portion can remain unfocused, such that both angular and translational position of said received laser beam can be monitored simultaneously.

23. A method of aligning both the angular and translational position of a laser beam at a rotating joint of a laser beam delivery system having one or more rotatable laser optics for directing said laser beam within said system, said method comprising the following steps:

(a) mounting an alignment tool on the rotatable part of a rotating joint of the laser beam delivery system to be aligned, said alignment tool comprising a chassis having means for receiving the laser beam, moans mounted on said chassis for monitoring the position of the laser beam received relative a two dimensional coordinate system during rotation of said tool about said rotating joint, and a laser beam focusing lens mounted on said chassis for focusing at least a portion of the laser beam received such that translational deviations of said received beam are eliminated from that focus beam;

(b) focusing at least a portion of said laser beam received by said alignment tool mounted on the rotatable part through the focusing lens and onto said means for monitoring the position of the laser beam;

(c) rotating the alignment tool with the rotatable part of the rotating joint while monitoring the focused beam on the monitoring means to determine angular deviation of said focused laser beam thereon, the focused beam tracing a rounded pattern on said monitoring means as said tool is rotated about said joint;

(d) adjusting one or more optics of said laser beam delivery system to center the focused beam within the said rounded tracing pattern and thereby correct for the angular deviations monitored;

(e) directing at least a portion of said laser beam received in an unfocused condition onto said means for monitoring the position of the laser beam;

(f) rotating the alignment tool with the rotatable part of the rotating joint while monitoring the unfocused beam on the monitoring means to determine translational deviations of said unfocused beam thereon, the unfocused beam tracing a rounded pattern on said monitoring means as said tool is rotated about said joint;

(g) adjusting one or more optics of said laser beam delivery system to center the unfocused beam within said rounded tracing pattern and thereby correct for the translational deviations monitored; and (h) repeating steps (b) through (g) as necessary to substantially eliminate all angular and translational deviations of said laser beam at said rotating joint.

24. The method of claim 23, wherein said focusing step and the determination and adjustment corrections for angular deviations are completed first, such method further comprising the step of then moving said focusing lens to a position outside of the beam path of the laser beam received within said tool so that the step of directing the unfocused laser beam onto the monitoring means can be accomplished.

25. The method of claim 24, further comprising the step of replacing said focusing lens in its original position so that the step of focusing the laser beam received can be repeated.

26. The method of claim 23, further comprising the step of splitting the received laser beam into two or more portions such that a portion of the received beam can be focused through the focusing lens and onto a monitoring means while another portion can be directed in an unfocused condition onto a monitoring means, such that both translational and angular position can be monitored simultaneously.

* * * * *

UNITED STATES PATENT AND TRADEMARK OFFICE
CERTIFICATE OF CORRECTION

PATENT NO. : 4,840,483

DATED : June 20, 1989

INVENTOR(S) : James L. Haffner

It is certified that error appears in the above-identified patent and that said Letters Patent is hereby corrected as shown below:

IN CLAIM 23:

Column 17, Line 3:
"moans" should read "means"

Column 17, Line 25:
first word "the" should be omitted

Signed and Sealed this

Seventeenth Day of April, 1990

*Attest:*

HARRY F. MANBECK, JR.

*Attesting Officer*  *Commissioner of Patents and Trademarks*